US008843452B2

(12) United States Patent
Baessler et al.

(10) Patent No.: US 8,843,452 B2
(45) Date of Patent: Sep. 23, 2014

(54) UTILIZING METADATA TO OPTIMIZE EFFICIENCY FOR ARCHIVING EMAILS

(75) Inventors: Michael Baessler, Neckartenzlingen (DE); Markus Lorch, Dettenhausen (DE); Juergen Maletz, Wildberg (DE); Katharina Pfeil, Stuttgart (DE); Daniel Pittner, Steinenbronn (DE); Dirk Seider, Grosselfingen (DE)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/916,778

(22) Filed: Nov. 1, 2010

(65) Prior Publication Data

US 2012/0109898 A1  May 3, 2012

(51) Int. Cl.
*G06F 7/00* (2006.01)
*G06F 17/30* (2006.01)
*G06Q 10/10* (2012.01)

(52) U.S. Cl.
CPC ........... *G06Q 10/107* (2013.01); *Y10S 707/922* (2013.01)
USPC ............................ 707/665; 707/668; 707/922

(58) Field of Classification Search
CPC .................... G06F 17/30221; G06F 17/30073; G06Q 10/107
USPC ......... 707/609, 661, 665, 667, 668, 670, 705, 707/736, 754, 755, 912, 917, 922
See application file for complete search history.

(56) References Cited

U.S. PATENT DOCUMENTS

| | | | | |
|---|---|---|---|---|
| 6,901,398 | B1 * | 5/2005 | Horvitz et al. | 709/207 |
| 7,107,298 | B2 * | 9/2006 | Prahlad et al. | 707/640 |
| 7,590,666 | B2 * | 9/2009 | Korman et al. | 707/200 |
| 7,624,151 | B2 * | 11/2009 | Heidloff et al. | 709/206 |
| 7,913,053 | B1 * | 3/2011 | Newland | 711/172 |
| 7,984,151 | B1 * | 7/2011 | Raz et al. | 709/226 |
| 8,230,192 | B2 * | 7/2012 | Balasubramanian et al. | 711/165 |
| 8,380,675 | B1 * | 2/2013 | Dwivedi | 707/661 |
| 2005/0053207 | A1 | 3/2005 | Claudatos et al. | |
| 2007/0038714 | A1 | 2/2007 | Sell | |
| 2007/0185921 | A1 | 8/2007 | Prahlad et al. | |
| 2007/0192360 | A1 | 8/2007 | Prahlad et al. | |
| 2008/0229037 | A1 * | 9/2008 | Bunte et al. | 711/162 |
| 2011/0264630 | A1 * | 10/2011 | Edelen | 707/665 |

OTHER PUBLICATIONS

Brian Babineau, "Realizing and Maximizing an E-mail Archive ROI with EMC SourceOne Email Management", Apr. 2009; Copyright 2009, The Enterprise Strategy Group, Inc., 9 pp.
Bob Spurzem, "Email Archiving Implementation—Five Costly Mistakes to Avoid (White Paper)", Software World, Jul. 2008; www.entreprenuer.com/tradejournals/article/182027587.html, 3 pp.

(Continued)

*Primary Examiner* — Marc Somers
(74) *Attorney, Agent, or Firm* — Farrokh Pourmirzaie; Edell, Shapiro & Finnan, LLC

(57) ABSTRACT

A method, a computer program product and a system are provided for archiving emails, where the email system includes at least one user mailbox configured to receive and store emails within the user mailbox and send emails from the user mailbox. User-specific metadata corresponding with emails received and sent by each user mailbox is collected. The collected user-specific metadata is analyzed to provide a predictive indication when and which emails will be archived for each user mailbox, and emails are archived for user mailboxes based upon the predictive indication for each user mailbox.

16 Claims, 2 Drawing Sheets

(56) References Cited

OTHER PUBLICATIONS

Data Management Forum, "Archiving and Tiered Storage for Email A DMF ILMI Best Practices White Paper", Oct. 1, 2004; Copyright 2004 SNIA Data Management Forum, 25 pp.

International Search Report and Written Opinion, DE920100070, Dec. 23, 2011, 11 pages.

XP002456414, Statement in accordance with the Notice from the European Patent Office dated Oct. 1, 2007 concerning business methods (OJ EPO Nov. 2007) 1 page.

\* cited by examiner

UTILIZING METADATA TO OPTIMIZE EFFICIENCY FOR ARCHIVING EMAILS

BACKGROUND

1. Technical Field

The present invention relates archiving email messages.

2. Discussion of the Related Art

Electronic message or email server systems can be configured to provide journaling of email messages (emails) that are sent and received by users of the server systems. Journaling of emails typically includes placing a separate copy of an email that is sent or received utilizing the server in a dedicated mailbox or database journal during the email delivery process. The email in the journal is a copy of the email that is distributed to the recipients, and may also contain additional information that is not available to the individual recipients, such as a listing of all email recipients in the email metadata (e.g., email addresses in the "To", "Cc" and "Bcc" header fields) as well as resolved groups.

Examples for archiving emails include, without limitation, archiving emails from the journal for compliance reasons, and archiving emails from individual user mailboxes for space-saving reasons. Archiving of messages typically occurs in the following sequence of operations:

Identifying one or more user mailboxes in which emails should be archived for space-saving purposes;

Searching and identifying messages that qualify for archiving (referred to as crawling);

Extracting the messages in a particular user mailbox that qualifies for archiving; and Storing the extracted messages in an archive.

Archiving for compliance typically occurs within the journal immediately or soon after an email has been sent or received for a mailbox in the email server. Journals are typically crawled in short intervals, where all messages in the journal can be archived. Archiving for space-saving in the user mailboxes typically occurs based upon an elapsed time period and can also include other restrictions (e.g., only messages having a certain memory size are archived). A typical example for archiving a user mailbox might be that all messages in the mailbox that have been received 4 weeks ago are archived if such messages still exist in the mailbox (i.e., the mailbox user has not already deleted such messages).

The operation process of crawling can cause a significant load on the server and increase the expense of archiving emails. Thus, it is important to avoid crawling of mailboxes that do not have enough eligible messages that qualify for archiving.

Typical email archiving systems use a declarative approach (e.g., based on time or amount of content in a user mailbox) to determine when a mailbox should be searched for e-mails that need to be archived. For example, a crawling operation to determine which emails to archive might require that all mailboxes for a particular server are searched a selected time period (e.g., every selected number of minutes, every selected number of days, etc.) so that every qualifying email for a particular user mailbox is archived within a selected timespan.

Utilizing a declarative approach to email archiving, a system administrator typically configures a schedule which is used to periodically check if processing is necessary by searching the mailbox for mails that qualify for processing. Additionally, all mailboxes are typically treated the same, and the sequencing of mailboxes being processed can be random. This might result in certain user mailboxes not being processed for archiving of emails prior to exceeding a mailbox quota associated with such mailboxes. In addition, this can lead to inefficient conservation of memory space, since some user mailboxes may fill up more rapidly with email content than others. Furthermore, it is too difficult and time-consuming for a system administrator to attempt to configure a separate archiving schedule for different mailboxes based upon how different mailboxes are used.

BRIEF SUMMARY

Accordingly, embodiments of the present invention include a method, a computer program product and a system for archiving emails. The email system comprises at least one user mailbox configured to receive and store emails within the user mailbox and send emails from the user mailbox. User-specific metadata corresponding with emails received and sent by each user mailbox is collected. The collected user-specific metadata is analyzed to provide a predictive indication when and which emails will be archived for each user mailbox, and emails are archived for user mailboxes based upon the predictive indication for each user mailbox.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
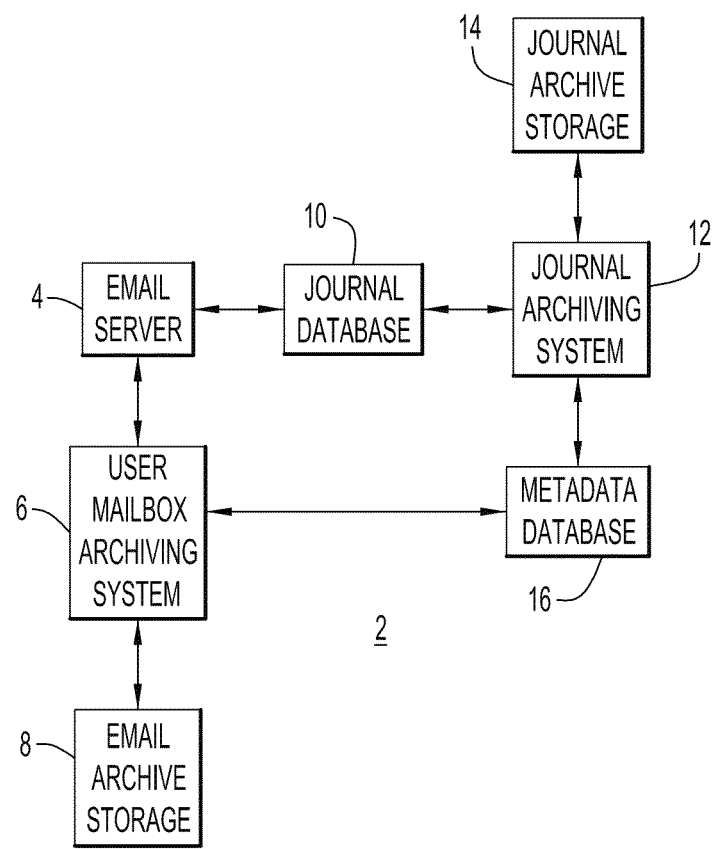
FIG. 1 is a block diagram illustrating an example embodiment of an email system including components for archiving emails in accordance with the present invention.

In accordance with example embodiments of the present invention, a method, system and computer program product provide optimization and efficiency for archiving of email messages (emails) by utilizing collected metadata and usage patterns of individual user mailboxes in an email system to determine when to crawl and archive mailboxes and, optionally, to also provide a ranking function for when to crawl and process user mailboxes for archiving within the system. The collected metadata is obtained from emails that are processed by the email system.

As used herein, the term "processed" in relation to an email message refers to incoming and outgoing emails for an email server in relation to each user mailbox as well as emails transferred between one or more user mailboxes internally within the email server. As further used herein, the term "collected" in relation to metadata refers to metadata which is extracted, copied, computed or obtained in any suitable manner from each processed email.

In an example embodiment in which a journaling system is utilized to copy processed emails (e.g., for compliance purposes), metadata can be collected from the journal copy of each processed email message associated with each user mailbox in the email system. However, it is noted that metadata can be collected from processed emails by the email server utilizing any other suitable process.

In the journal database, each email is archived almost instantly or soon after such email has been stored in the journal database. The collected metadata for emails associated with each mailbox in the journal database can be used to generate statistical information (e.g., a statistical model) for each mailbox, where the statistical information is used to predict certain features in relation to each mailbox including, without limitation, predicting a maximum number of messages that can be in a particular mailbox, predicting eligible email content that qualifies for archiving within a particular mailbox, and when to crawl and archive emails within a particular mailbox. In particular, the statistical information that is generated for each user mailbox using the collected metadata from the journal database can be used to predict features such as a maximum number of messages that will be available in a user mailbox that match specified restrictions (e.g., size restrictions for user mailboxes).

There are various types of metadata in emails that can be collected in the process for use in generating a statistical model to determine when to process user mailboxes for email archiving. Examples of types of metadata in emails that can be collected include, without limitation, sender information, recipient information (e.g., recipients in the "To" field of the email as well as the "Cc" and "Bcc" fields), subject matter information (e.g., information from the subject matter field of the email), information about memory size of the email, information about the memory size, number and/or types of attachments with the email, time and date message was sent, delivered and/or viewed, etc. Any suitable one or more combinations or types of information can be obtained from the email metadata to generate a statistical model for predicting the content in a particular user mailbox in order to determine suitable time periods for crawling and archiving of emails within the user mailbox. Crawling of user mailboxes refers to searching a particular user mailbox to identify which emails in the mailbox qualify for archiving. The types of metadata to be collected from emails archived in the journal database in order to generate statistical information for each user mailbox will depend upon the qualifying criteria for archiving emails in a particular email system.

An example email system for archiving emails and which includes a journaling system is schematically depicted in the block diagram of FIG. 1. In particular, email system 2 includes an email server 4 which includes user mailboxes. The email server 4 is operatively coupled to any other servers and/or networking systems to facilitate sending and receiving of emails to and from user mailboxes associated with the email server. In addition, the email server 4 facilitates transfer of email messages between user mailboxes within the email server. The email server 4 is also operatively coupled with a user mailbox archiving system 6. The user mailbox archiving system 6 is operatively coupled to an email archive storage system 8 that stores archived emails for the user mailboxes. The user mailbox archiving system 6 further includes a processor that utilizes statistical information obtained in the manner described below to determine when to crawl user mailboxes and to archive emails in the user mailboxes.

The email server 4 is further operatively coupled with a journal database 10. As noted above, all processed emails from user mailboxes are copied along with metadata associated with such emails to the journal database 10. The journal database 10 is further operatively coupled with a journal archiving system 12. The journal archiving system 12 archives email messages almost instantly or a selected time period after such emails have been stored in the journal database 10 (where such emails are then removed from the journal database 10 to conserve storage space). The journal archiving system 12 is further operatively coupled to a journal archive storage system 14 and a metadata database 16. The archived email messages from the journal database 10 are stored within the journal archive storage system 14, and the collected metadata from the emails processed by the journal archiving system 12 is stored in the metadata database 16. The metadata database 16 is further operatively coupled with the user mailbox archiving system 6, such that the processor of the user mailbox archiving system 6 can access stored metadata for generating or updating statistical information associated with each user mailbox.

Each of the email server 4, user mailbox archiving system 6, email archive storage system 8, journal database 10, journal archiving system 12, journal archive storage system 14 and metadata database 16 can be implemented as a separate unit or, alternatively, combined with any one or more of the other components in a single unit. For example, the user mailbox archiving system 6 and the journal archiving system 12 can be implemented as a single archiving system with one or more processors configured to perform the operations of archiving emails from the journal database and the user mailboxes.

The email server, archiving systems and database storage systems of system 2 can be any suitable computer systems implemented by any type of hardware and/or other processing circuitry. In particular, the server and databases may be implemented by any quantity of conventional or other computer systems or devices (e.g., computer terminals, personal computers (e.g., IBM-compatible, personal computers, APPLE MACINTOSH personal computers, tablet, laptop, etc.), etc.), cellular telephones, personal data assistants (e.g., devices commercially available under the trademarks or trade names PALM PRE, DROID, IPHONE, etc.), etc., and may include any commercially available operating system (e.g., commercially available operating systems associated with the trademarks or trade names AIX, ANDROID, LINUX, OSX, SUN SOLARIS, UNIX, WINDOWS, etc.) and any commercially available or custom software (e.g., browser software, communications software, word processing software, etc.). These systems may include types of displays and input devices (e.g., keyboard, mouse, voice recognition, etc.) to enter and/or view information. In addition, emails may be sent or received by the email server and retained by the databases in any suitable manner.

Figure 2:
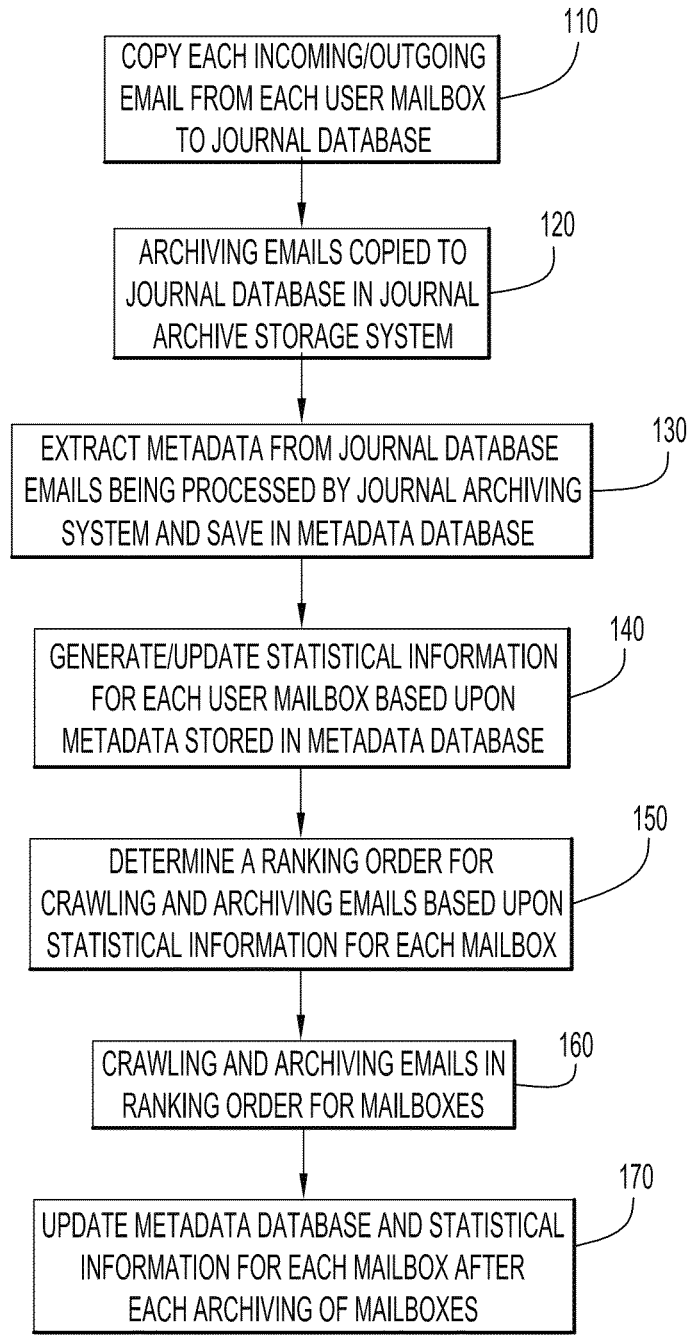
FIG. 2 provides a flowchart depicting an example method of archiving emails according to an embodiment of the present invention and utilizing the email system of FIG. 1.

An example method of utilizing the system of FIG. 1 is described with reference to the flowchart of FIG. 2. Referring to FIG. 2, the journal database 10 continuously copies each processed email message (i.e., an incoming or outgoing message for the email server, or an email message that is transferred to or from a user mailbox internally within the email server), including metadata for each email message, that is associated with each user mailbox of the email server 4 (step 110). Emails stored in the journal database 10 are continuously archived by the journal archiving system 12 for storage in the journal archive storage system 14 (step 120). The archiving of emails in the journal database 10 can occur immediately or at some suitable time period after such emails are stored in the journal database 10.

Metadata from journal database emails that are being processed by the journal archiving system 12 is collected and stored in the metadata database 16 for each user mailbox (step 130). The collected and stored metadata is organized so as to be user-specific. In other words, stored metadata is identified as being collected from emails associated with specific user mailboxes. It is noted that the collection and storage of metadata (step 130) can occur before, after, or in parallel with the archiving of journal database emails in the journal archive storage system 14 (step 120). The stored metadata is accessible by the processor of the user mailbox archiving system 6, and this metadata is used to generate and also update statistical information for each user mailbox. The processor periodically queries the metadata database 16 in order to generate or update statistical information for each user mailbox, and the statistical information is used by the user mailbox archiving system 6 to determine whether and when to crawl each user mailbox. The determination regarding whether or when to crawl each user mailbox for archiving emails can be on an individual basis (i.e., based upon the statistical information that is associated with each mailbox), on a group basis (i.e., by grouping mailboxes with generated statistical information that have similar profiles), or in any other suitable manner.

The metadata stored in the metadata database 16 enables predicting of the content in user mailboxes that is eligible or qualifies for archiving. For example, archiving criteria might be based upon one or a number of qualifying factors including, without limitation, an overall mailbox memory size limit, a memory size limit on emails having a certain age (e.g., emails in a user mailbox that have a receipt date that is any selected number of days prior to the present date), a memory size limit on particular emails with one or more attachments, etc. The selection of metadata to be collected and stored at the metadata database 16 and/or the types of metadata selected by the processor of the user mailbox archiving system 6 to generate statistical information will be based upon the qualifying criteria for a particular email system that renders emails eligible for archiving. The metadata database 16 is queried for information for each mailbox by the user mailbox archiving system processor based upon the archiving qualification criteria, and the statistical information is generated using the queried metadata.

The statistical information generated for each user mailbox can be used to establish a ranking order for crawling and archiving user mailboxes (step 150). Mailboxes having certain statistical information can be set with a higher ranking order than others, where the statistical information provides a prediction that the mailbox has a large number and/or large memory size of emails that qualify for archiving. For example, a ranking order or scoring system can be set so as to archive the mailboxes that are closer to their quota (e.g., where the quota corresponds with one or more of a number of emails over a certain age, size of total email content, number of emails within the mailbox or that qualify for archiving, etc.) and/or would benefit the system by saving memory space before other mailboxes that are further away from their quota or are less taxing on the system memory space allotted for the mailboxes.

Certain mailboxes can also be excluded from archiving based upon the statistical information predicting that the number and/or memory size of emails to be archived for a particular mailbox does not exceed a predetermined threshold required for archiving (e.g., if the size of email data to be archived is less than a threshold amount of 1 MB, or if the mailbox size has not reached a certain percentage of its quota, do not process the mailbox for archiving). In particular, the user mailbox archiving system processor can filter out mailboxes that have not achieved a minimum threshold criteria, as determined by the predictive statistical information associated with these mailboxes, such that only mailboxes that qualify for archiving are passed through the filter and processed for archiving. This facilitates more efficient operation of the email system by reducing unnecessary crawling of certain user mailboxes as well as email server accesses.

After establishing a ranking order for mailboxes (and, optionally, filtering out mailboxes that do not meet a minimum threshold to qualify for archiving), mailboxes are periodically crawled and actual emails which qualify for archiving are actually extracted from mailboxes, archived and stored within the email archive storage system 8 (step 160).

In order to keep the predictive statistical information as accurate as possible for each mailbox, the metadata database is updated by removing metadata corresponding with emails that have already been archived for each mailbox, and the statistical information is also updated for each mailbox based upon such changes to the metadata database (step 170). Accordingly, the metadata database and statistical information do not contain information about emails that were already archived for each user mailbox.

The statistical information for each mailbox can also be updated by providing a feedback loop in which a periodic comparison is made of the predicted archiving load of emails (which is determined utilizing the statistical information) for each mailbox vs. the actual archiving load of emails (which is determined from crawling) for each mailbox. The metadata stored in the metadata database 16 and the statistical information provide a prediction of the eligible email content in each mailbox of the email server 4 for archiving that would be found if the mailbox was crawled. This is because the statistical information and metadata is based upon emails that are copied into the journal database 10 and not the actual email messages that might be in a user mailbox at a given time. Each mailbox can actually have more or fewer emails than what is predicted depending upon a number of factors including, without limitation, whether emails are deleted from a particular mailbox or emails added to the mailbox have not been accounted for in the journal database (e.g., a user may copy or drag content from the local email archive storage system 8 back into the user's mailbox). Thus, the updating of the statistical information used for providing a predictive indication of whether or when to archive emails (and which emails to archive) for each user mailbox can be changed automatically based on actual data to improve future predictions.

Certain scenarios may occur in which less emails are actually archived for a particular mailbox than the number of qualifying emails as predicted by the statistical information for this mailbox (e.g., a user may delete a number of messages between periods in which the user mailbox is crawled and emails are archived). A correction factor can be generated for each mailbox based upon a comparison of predicted emails to be archived vs. actual number of emails to be archived (based upon crawling of the mailbox). For example, the correction factor can be a ratio of: (emails to be archived as found by crawling)/(predicted emails for archiving). For scenarios in which a user deletes a number of emails from the user mailbox during a period that is between archive processing of the user mailbox, the correction factor for this user mailbox might be less than 1 (e.g., if emails that qualify for archiving are deleted from the user mailbox prior to the actual crawling and archiving processing step). The correction factor for each user mailbox can be stored as metadata in the metadata database 12 and can be used to update or revise the statistical information for each user mailbox, including scoring/ranking and filtering associated with user mailboxes.

A correction factor can be implemented so as to automatically improve the predictive indication for individual mailboxes based upon the deletion patterns of the individual user. In one example embodiment, the general rules for the system may provide an assumption that the average user mailbox has 10% of emails deleted between a previous crawling and archiving round and a subsequent crawling and archiving round. For a particular mailbox, the predictive indication can assume that a greater number of emails are deleted (e.g., 20% or greater) based upon the history of user patterns for this particular mailbox as determined by the correction factor and/or any other factors. Automatic optimization of the predictive indication for when and which emails to archive for each user mailbox can be thus be achieved by application of the feedback loop in which the predictive indication is compared with the actual emails that qualify for archiving.

In addition, each user mailbox can be periodically monitored to ensure that the user mailbox does not rapidly approach or surpass its quota. For example, in scenarios in which a user drags a large number of archived emails from the email archive storage system back into the user's mailbox, the prediction (based upon current statistical information for the user mailbox) may indicate that the user mailbox is not approaching its quota while the actual quota for the user mailbox might be approaching its limit. The email server can be configured to periodically check the memory size of emails within each user mailbox and, if there is a difference between the actual memory size for the user mailbox and the predicted memory size of the user mailbox (as determined from the current statistical information) that exceeds a threshold amount, the user mailbox can be set for immediate crawling and archiving. Alternatively, the ranking of user mailboxes can be adjusted such that crawling and archiving of this user mailbox is prioritized over other user mailboxes during the next crawling and archiving processing session.

Thus, in the method described above and depicted in the flowchart of FIG. 2, steps 110-130 (the copying of incoming/outgoing emails into the journal database, archiving of such emails in the journal database and extracting metadata for such archived emails) occurs continuously as incoming and outgoing emails are processed by each user mailbox of the email server. Steps 140-160, which relate to generating or updating statistical information for each user mailbox, determining a ranking order (and optional filtering) for the user mailboxes, and crawling and archiving of user mailboxes based upon the ranking order can occur at selected process intervals that are set by the email system based upon a particular scenario and expected email archiving loads for the system.

In addition, the ranking order for user mailboxes can be set such that groups or clusters of mailboxes having a similar archiving need or archiving load profile, as determined by the statistical information for the user mailboxes, can be crawled at the same or similar time intervals and/or with the same or similar ranking order. Clustering algorithms, such as k-means clustering techniques, can be utilized when analyzing the metadata for user mailboxes as stored in the metadata database. The clustering algorithms can be used to find groups or clusters of user mailboxes having similar profiles based upon the statistical information generated/updated for these mailboxes. Thus, the email system can be configured to automate the processing intervals for user mailboxes, in which groups of user mailboxes having similar load profiles are crawled for archiving of emails during the same processing sessions.

Providing an automated clustering of user mailboxes using a suitable clustering algorithm simplifies the process of archiving emails, since the system administrator need only specify an archiving policy (i.e., a set of rules for archiving emails within a user mailbox), and the email system will automatically set crawling and archiving of emails within user mailboxes or groups of user mailboxes based upon the statistical information generated for each user mailbox. In addition, the archiving processing intervals for any user mailbox or groups of user mailboxes can change in an automated manner based upon updating of statistical information utilizing the process as described above and depicted in the flowchart of FIG. 2.

An example of using collected metadata to determine when and what types of emails to archive for a mailbox may be to provide a predictive indication of how fast a user mailbox is growing and how much email data is available for archiving. In this example, metadata can be monitored that is associated with the number and size of emails for the user mailbox. The ranking of user mailboxes for archiving can be set, for example, based upon statistical information for each user mailbox that indicates which user mailboxes delete the most emails over a selected period (which can be determined, for example, by analyzing the correction factor for user mailboxes). The user mailboxes that historically delete fewer emails than average can be set to a higher ranking than those user mailboxes that delete more emails than average, such that user mailboxes with a higher ranking are crawled and archived before user mailboxes with a lower ranking. The feedback loop that compares the statistical information obtained from the collected metadata and which provides predictive indications of when to archive user mailboxes vs. information relating to actual emails that qualify for archiving in user mailboxes can be used to change the ranking order for archiving of user mailboxes.

As noted above, while the above example embodiments describe the collecting of metadata from emails archived from a journal database, the present invention is not limited to obtaining the metadata from emails in this manner. The present invention encompasses the collection of metadata from processed emails in any suitable manner. For example, metadata can be collected at any point during transfer of an email to or from one or more user mailboxes located at one or more email servers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for an email system, the computer program product comprising:
    a tangible computer readable storage device having computer readable program code embodied therewith, the computer readable program code configured to:
      collect user-specific metadata corresponding with emails received and sent by a plurality of user mailboxes of the email system;
      analyze the collected user-specific metadata to provide a predictive indication of when emails will be archived for the plurality of user mailboxes;
      determine a ranking order in which each of the plurality of user mailboxes are to be archived based on the predictive indication;
      determine a user mailbox to archive based on the ranking; and
      archive emails for the determined user mailbox.

2. The computer program product of claim 1, wherein the email system further comprises a journal database, and the computer readable program code is further configured to:
    copy any email received by one of the plurality of user mailboxes from another of the plurality of user mailboxes and any email sent by the one of the plurality of user mailboxes to at least one other user mailbox within the journal database, wherein the collected user-specific metadata for each sent and received email is also stored within the journal database.

3. The computer program product of claim 1, wherein the computer readable program code is further configured to:
change the ranking order in which each of the plurality of user mailboxes are archived in response to changes in the collected user-specific metadata.

4. The computer program product of claim 3, wherein the ranking order includes ordering of user mailboxes into groups based upon the collected user-specific metadata.

5. The computer program product of claim 1, wherein the computer readable program code is further configured to:
store the collected user-specific metadata in a storage location; and
delete from the storage location stored metadata that corresponds with emails that have been archived.

6. The computer program product of claim 1, wherein archiving emails for the determined user mailbox includes computer readable program code configured to:
perform an archive processing roared for the determined user mailbox based upon the ranking, wherein the archive processing rotund comprises:
crawling the determined user mailbox to determine which emails in the user mailbox qualify for archiving; and
archiving the qualifying emails from the determined user mailbox in an archiving location.

7. The computer program product of claim 6, wherein the computer readable program code is further configured to:
determine a correction factor for the determined user mailbox based upon a comparison of the qualifying emails from the archive processing round with the predictive indication of emails to he archived; and
revise the predictive indication of emails to be archived for the determined user mailbox in a subsequent archive processing round by analyzing the correction factor in combination with the collected user-specific metadata.

8. The computer program product of claim 6, wherein the archive processing round is performed for a group of the plurality of user mailboxes, and the computer readable program code is further configured to:
filter selected mailboxes from being processed in the archive processing round based upon the user-specific metadata associated with the selected mailboxes.

9. The computer program product of claim 1, wherein the predictive indication further identifies which emails will be archived for the determined user mailbox.

10. A system comprising:
an email server including a plurality of user mailboxes to receive and store emails within the plurality of user mailboxes and send emails from the plurality of user mailboxes;
an email archive storage system; and
a processor configured with logic to:
collect user-specific metadata corresponding with emails received and sent by the plurality of user mailboxes;
analyze the collected user-specific metadata to provide a predictive indication of when emails will be archived for the plurality of user mailboxes;
determine a ranking order in which each of the plurality of user mailboxes are to be archived based on the predictive indication;
determine a user mailbox to archive based on the ranking; and
archive emails for the determined user mailbox in the email archive storage system.

11. The system of claim 10, further comprising:
a journal database configured to copy any email received by one of the plurality of user mailboxes from another of the plurality of user mailboxes and any email sent by the one of the plurality of user mailboxes to at least one other user mailbox within the journal database, wherein the collected user-specific metadata for each sent and received email is also stored within the journal database.

12. The system of claim 10, wherein the processor is further configured to change the ranking order in which the plurality of user mailboxes are archived in response to changes in the collected user-specific metadata.

13. The system of claim 10, further comprising a metadata database configured to store the collected user-specific metadata, wherein the system is configured to delete from the metadata database stored metadata that corresponds with emails that have been archived.

14. The system of claim 10, wherein archiving emails for the determined user mailbox in the email archive storage system includes the processor further configured to perform an archive processing round for the determined user mailbox based upon the ranking, wherein the archive processing round comprises:
crawling the determined user mailbox to determine which emails qualify for archiving; and
archiving the qualifying emails from the determined user mailbox in an archiving location.

15. The system of claim 14, wherein the processor is further configured to:
determine a correction factor for the determined user mailbox based upon a comparison of the qualifying emails from the archive processing round with the predictive indication of emails to be archived; and
revise the predictive indication of emails to be archived for the determined user mailbox in a subsequent archive processing round by analyzing the correction factor in combination with the collected user-specific metadata.

16. The system of claim 10, wherein the predictive indication further identifies which emails will be archived for the determined user mailbox.

* * * * *